United States Patent
McGee et al.

(10) Patent No.: US 7,040,171 B2
(45) Date of Patent: May 9, 2006

(54) CARRIER TAPE VIBRATOR MODULE

(75) Inventors: Donald P. McGee, Oconomowoc, WI (US); Robert G. Bertz, Wauwatosa, WI (US); Michael Reilly, New Berlin, WI (US); Merlin E. Behnke, Grafton, WI (US); Chris Urban, Waukesha, WI (US)

(73) Assignee: International Product Technology, Inc., New Berlin, WI (US)

( * ) Notice: Subject to any disclaimer, the term of this patent is extended or adjusted under 35 U.S.C. 154(b) by 0 days.

(21) Appl. No.: 10/910,127

(22) Filed: Aug. 3, 2004

(65) Prior Publication Data

US 2005/0000306 A1 Jan. 6, 2005

Related U.S. Application Data

(63) Continuation of application No. 10/050,900, filed on Jan. 16, 2002, now abandoned.

(60) Provisional application No. 60/261,945, filed on Jan. 16, 2001.

(51) Int. Cl.
*G01M 7/02* (2006.01)
*H01L 21/44* (2006.01)
*B65B 1/22* (2006.01)

(52) U.S. Cl. .............................. 73/662; 73/52; 438/106; 53/437

(58) Field of Classification Search .................. 73/662, 73/663, 666, 862.41, 862.391, 667, 52; 356/430; 53/471, 453, 525, 559, 437; 438/106; 209/509, 209/538

See application file for complete search history.

(56) References Cited

U.S. PATENT DOCUMENTS

| | | | |
|---|---|---|---|
| 2,899,783 A | | 8/1959 | Otto |
| 3,465,497 A | | 9/1969 | Tatibana |
| 3,566,579 A | | 3/1971 | Russell |
| 3,856,414 A | * | 12/1974 | Menary ...................... 356/430 |
| 4,198,166 A | | 4/1980 | Tuns |
| 4,262,549 A | * | 4/1981 | Schwellenbach ............... 74/87 |
| 4,344,269 A | | 8/1982 | Dieterlen et al. |
| 4,884,696 A | * | 12/1989 | Peleg ......................... 209/545 |
| 4,922,688 A | | 5/1990 | Langen et al. |
| 5,054,606 A | | 10/1991 | Musschoot |
| 5,191,693 A | | 3/1993 | Umetsu |
| 5,729,963 A | | 3/1998 | Bird |
| 5,798,588 A | | 8/1998 | Okuyama et al. |
| 5,801,466 A | | 9/1998 | Odagiri et al. |
| 5,802,804 A | | 9/1998 | Esposti et al. |

(Continued)

*Primary Examiner*—Hezron Williams
*Assistant Examiner*—Jacques M Saint-Surin
(74) *Attorney, Agent, or Firm*—Michael Best & Friedrich LLP

(57) ABSTRACT

A vibrator module adapted for use in a taper apparatus for advancing carrier tape having a plurality of compartments and for placing parts in the compartments. The vibrator module includes a motor that includes an output shaft that rotates in response to operation of the motor. The vibrator module also includes an eccentric weight mounted to and rotatable with the output shaft. The eccentric weight causes the motor to vibrate in response to rotation of the output shaft and eccentric weight. The vibrator module further includes a vibration transferring member interconnected with the motor and operable to transfer vibrations from the motor to the carrier tape to cause the parts to settle into the bottoms of the compartments.

13 Claims, 4 Drawing Sheets

U.S. PATENT DOCUMENTS

| | | |
|---|---|---|
| 5,898,248 A | 4/1999 | Ikeda et al. |
| 5,943,214 A | 8/1999 | Sato et al. |
| 5,952,745 A | 9/1999 | Yasuda |
| 5,979,640 A | 11/1999 | Horton |
| 5,986,367 A | 11/1999 | Tsuzaki et al. |
| 6,024,210 A | 2/2000 | Rosenstrom |
| 6,081,055 A | 6/2000 | Narusawa |
| 6,133,657 A | 10/2000 | Semenik et al. |
| 6,140,724 A | 10/2000 | Lee |
| 6,237,749 B1 | 5/2001 | Musschoot et al. |
| 6,475,826 B1 * | 11/2002 | Sritulanont et al. ......... 438/106 |
| 6,528,760 B1 * | 3/2003 | Canella et al. ......... 219/121.82 |
| 2004/0044729 A1 * | 3/2004 | Hayashi et al. |

* cited by examiner

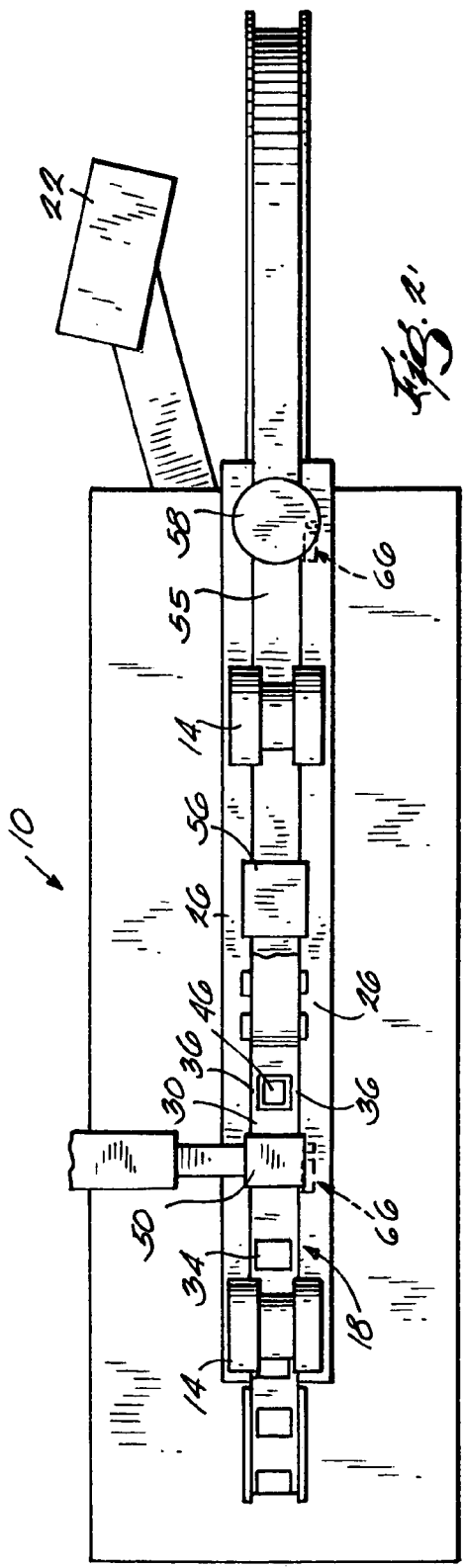
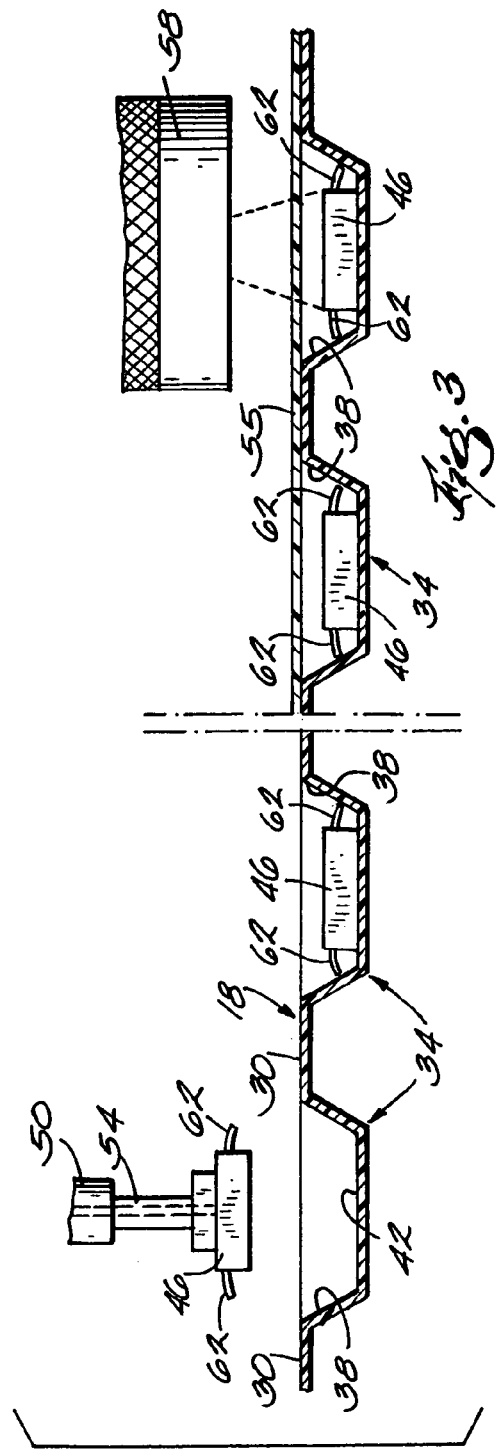

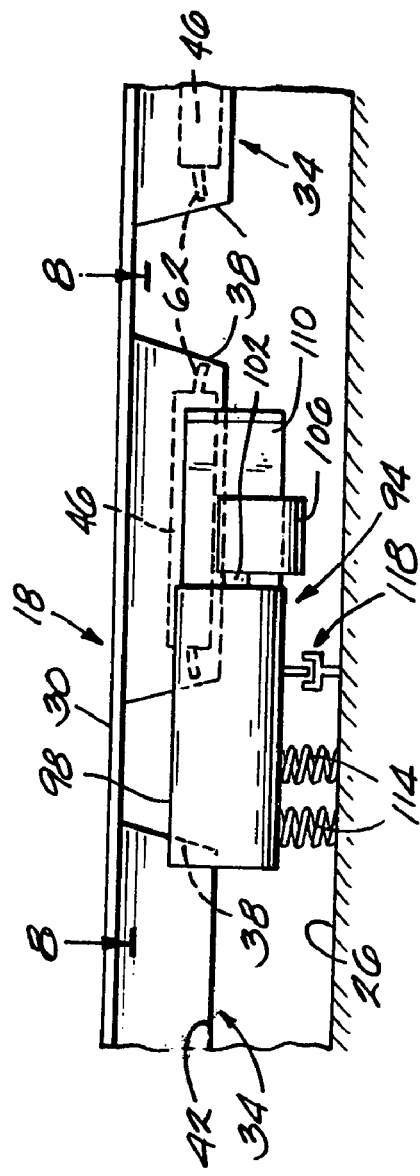
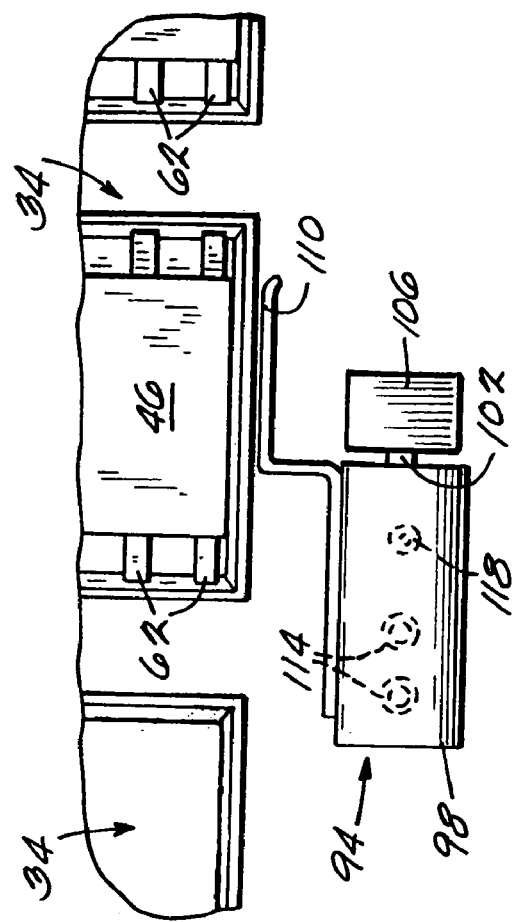

CARRIER TAPE VIBRATOR MODULE

RELATED APPLICATIONS

The present application is a continuation of U.S. patent application Ser. No. 10/050,900, filed Jan. 16, 2002, now abandoned, which claims the benefit of U.S. Provisional Patent Application Ser. No. 60/261,945, filed Jan. 16, 2001, the specifications of which are hereby incorporated by reference.

FIELD OF THE INVENTION

The present invention relates to a vibrator module for vibrating a carrier tape used to package electronic parts.

BACKGROUND

It is known to package electronic computer chips, microprocessors, and the like (herein referred to generically as "parts") in the compartments of a carrier tape and to wind the carrier tape on a reel for shipping. Typically, the parts are inspected immediately before being placed in the compartments of the carrier tape and are in some cases inspected after they are positioned within the compartments of the carrier tape.

SUMMARY

While a part is in a compartment of the carrier tape, an overhead camera is often used to inspect the leads of the part. If the part is not positioned properly within the compartment, there may be false rejections of good parts. Thus, it is important to properly position the parts within the compartments of the carrier tape to reduce as much as possible the incidence of false rejections.

The present invention achieves the goal of properly positioning the parts in the carrier tape compartments by positioning a vibrator module near the carrier tape compartments. Before a part is inspected in a compartment, the vibrator module is turned on and transfers vibration to the carrier tape. The vibrations cause the part to settle into the proper position within the compartment. If the part is rejected by the in-tape inspection camera, a second vibrator module may be used to again vibrate the tape. The part may then be re-inspected to determine whether the first rejection was a false one.

The vibrator module preferably includes a small electric motor having an eccentric weight mounted on its output shaft. A vibration transferring member is interconnected with the electric motor, and extends to a position near the carrier tape. The motor vibrates as the output shaft rotates, and the vibration is transferred through the vibration transferring member to the carrier tape, thereby causing the part to properly settle in the tape compartment.

Other features and advantages of the invention will become apparent to those skilled in the art upon review of the following detailed description, claims, and drawings.

BRIEF DESCRIPTION OF THE DRAWINGS

FIG. 2 is a top view of the taper apparatus of FIG. 1.

FIG. 3 is a schematic side cross-section view of a carrier tape in the taper apparatus.

FIG. 7 is a partially broken away schematic side view of an alternate construction of the vibrator module.

FIG. 8 is a partial cross section view along line 8—8 of FIG. 7.

Figure 1:
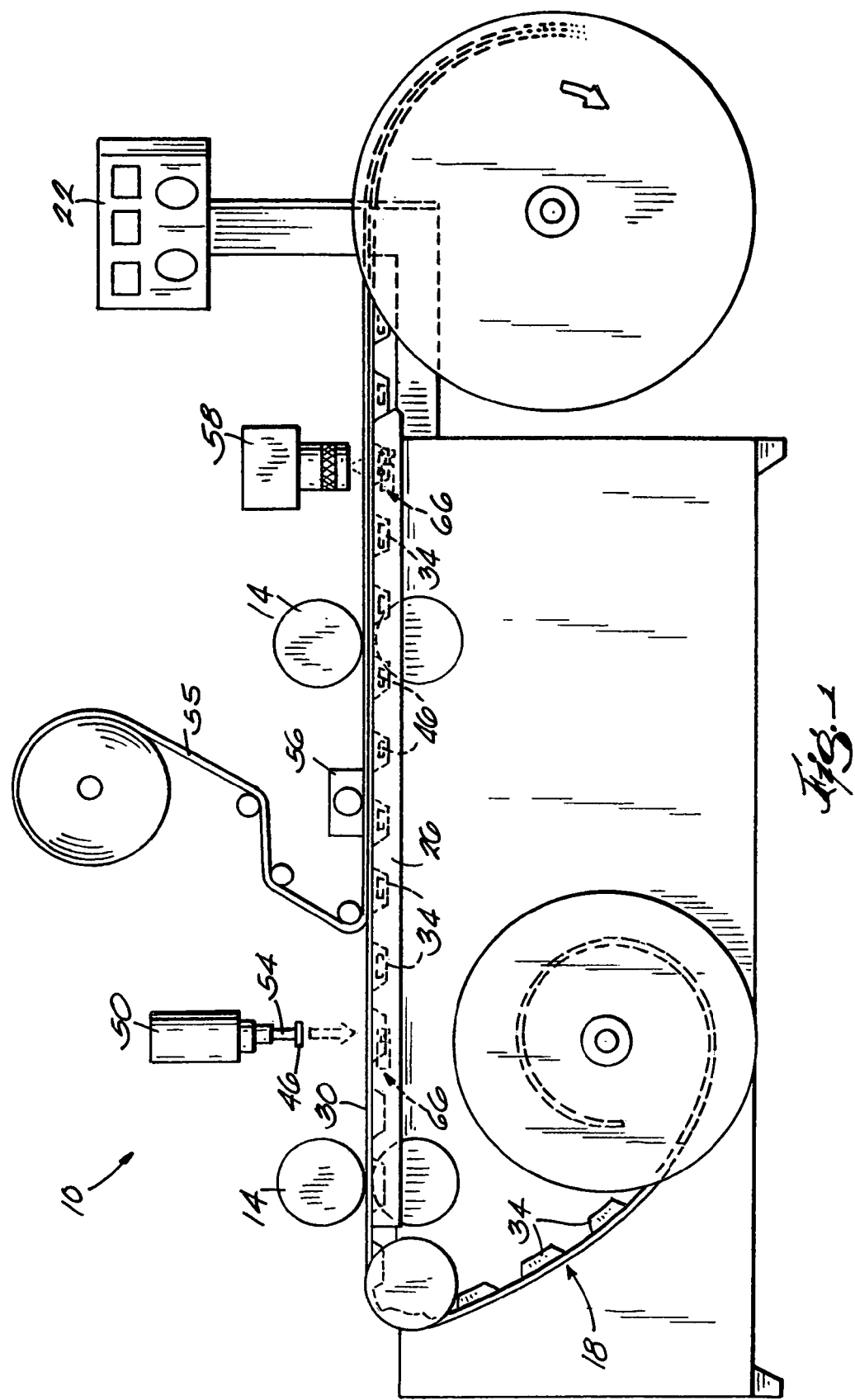
FIG. 1 is a side view of a taper apparatus embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIGS. 1 and 2 illustrate a taper machine or taper apparatus 10 including a drive assembly 14 for advancing a carrier tape 18 through the taper apparatus 10. The apparatus 10 also includes a control panel 22 and the appropriate electronic control system for controlling the drive assembly 14 and other components of the apparatus 10. The apparatus 10 also includes a pair of guide rails or members 26 that guide the carrier tape 18 along the apparatus 10.

As seen in FIG. 3, the carrier tape 18 includes a top portion 30 and a plurality of compartments or pockets 34 recessed with respect to the top portion 30. The carrier tape 18 also has two flanges 36 (FIG. 6) that may extend over the top of the guide members 26 of the taper apparatus 10 such that the compartments 34 extend down between the guide members 26. The compartments 34 include tapered or angled side walls 38 and flat bottoms 42, and are thus designed to guide parts 46 into a relatively horizontal or flat orientation at the bottom of the compartments 34. The taper apparatus 10 includes a pick-and-place head 50 having a vacuum nozzle 54. The pick-and-place head 50 moves up and down to position one part 46 in each compartment 34. The tape 18 is then advanced along the taper apparatus 10, and a clear cover tape 55 is sealed to the flanges 36 with a sealing shoe 56. The parts 46 are then examined in-tape through the cover tape 55 with a robotic vision system including a camera 58. Alternatively, the camera 58 may be positioned to inspect the parts 46 prior to the cover tape 55 being applied. The robotic vision system is used to inspect leads 62 and other aspects of the parts 46.

In some existing taper machines, false rejections are made by the robotic vision system when the parts are canted or tilted, or are otherwise not settled properly within the compartments. Such misalignment may occur when, for example, the pick-and-place head is not positioned directly above the tape compartment, the part is not centered on the pick-and-place head, or the part is not cleanly dropped into the compartment by the pick-and-place head. Misaligned parts may appear to have leads that are too long or too short to pass inspection, even though the leads are in fact of the proper length. For example, if the part is not settled, the camera 58 may see a partial reflection of the part off of the side walls 38 that distorts the true length of the leads 62.

Figure 4:
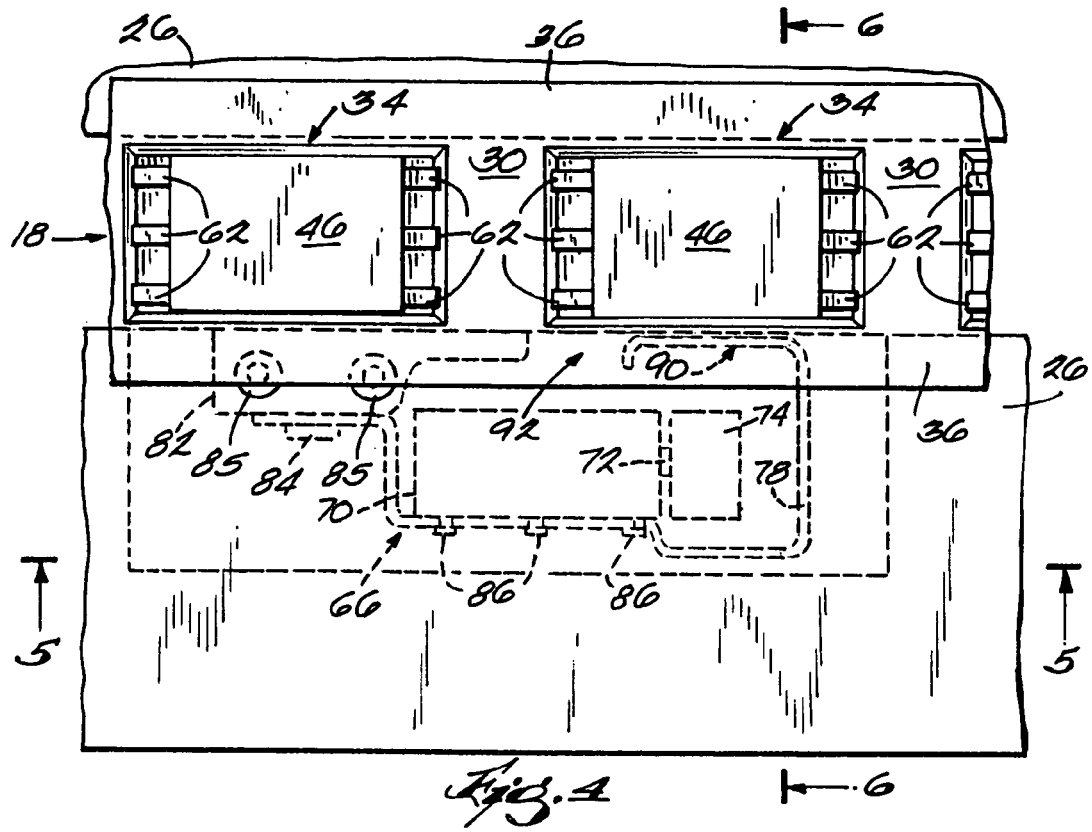
FIG. 4 is an enlarged view of a portion of FIG. 2, illustrating a vibrator module for use in the taper apparatus.
Figure 5:
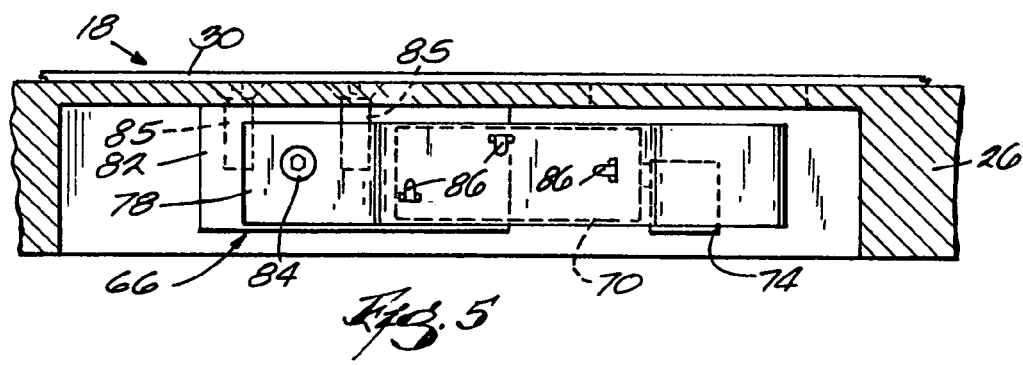
FIG. 5 is a sectional view along line 5—5 of FIG. 4.
Figure 6:
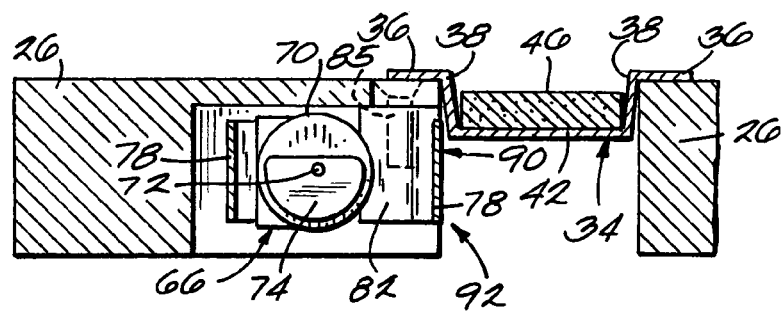
FIG. 6 is a sectional view along line 6—6 of FIG. 4.

Referring to FIGS. 4–6, the apparatus 10 includes two vibrator modules 66, each including a small electric motor 70 having an output shaft 72, an eccentric weight 74 mounted to the output shaft 72, and a finger or a vibration transferring member which in the illustrated embodiment is a thin flexible strip of metal 78. The flexible strip 78 is attached in a cantilevered fashion at one end to a mounting boss 82 by a fastener 84 and projects away from the mounting boss 82. The mounting boss 82 is mounted to the taper apparatus 10 or one of the guide members 26 by fasteners 85. The motor 70 is mounted to the flexible strip 78 with bent fingers 86 (as illustrated in FIG. 5), fasteners, solder, brazing, welding, or any other suitable attachment means. The motor 70 is therefore supported in cantilevered fashion by the flexible strip 78. The flexible strip 78 is bent around the eccentric weight 74 and has a portion 90 positioned in a window 92 in one of the guide members 26. The portion 90 is thus directly alongside the compartment 34 that is currently under the pick-and-place head 50 or camera 58. Alternatively, the vibrations could be passed through the guide member 26, and the window 92 would not be needed.

In operation the first vibrator module 66 is positioned next to the carrier tape 18 under the pick-and-place head 50, and the second vibrator module 66 is positioned next to the carrier tape 18 under the camera 58 as seen in FIGS. 1 and 2. Each time a part 46 is positioned in a compartment 34 by the pick-and-place head 50, the control system actuates the electric motor 70 of the first vibrator module 66. The rotating eccentric weight 74 creates vibrations which are passed by the flexible strip 78 to the compartment 34 currently under the pick-and-place head 50. If the part 46 is not properly positioned (i.e., in a flat orientation at the bottom of the compartment 34), the vibrations cause the part 46 to settle into a relatively flat orientation at the bottom 42 of the compartment 34 prior to inspection by the robotic vision system. If the part 46 is out of the compartment 34, the vibrations help to move the part 46 into the compartment 34. If the part 46 is properly positioned in the compartment 34, the part 46 will remain in the relatively flat orientation at the bottom of the compartment 34 during such vibration.

When the robotic vision system detects a defective part 46, a reject signal is sent to the controller. The controller then activates the second vibrator module 66 to vibrate the carrier tape 18 and compartment 34 under the camera 58. The part 46 is then re-inspected to see if the rejection was a false rejection due to the part 46 not being properly settled within the compartment 34. An operator of the apparatus 10 may program the control system with the number of re-inspections that should be performed before the part 46 is finally determined to be a bad part 46. The control system actuates the motor 70 before each re-inspection.

It is preferable to adjust the speed of the motor 70 to adjust the amplitude and frequency of vibration produced to a suitable level for the tape 18 and parts 46 involved. The speed may be adjusted by regulating the amount of voltage entering the motor 70. A large voltage entering the motor 70 actuates the motor 70 at a high speed and produces large vibrations, while a small voltage entering the motor 70 actuates the motor at a low speed and produces small vibrations. Lower voltage and small vibrations are used for small compartments 34 and small parts 46, while high voltage and large vibrations are used for large compartments 34 and large parts 46.

When at rest, the flexible strip 78 preferably does not contact the adjacent compartment 34, but is very close to it. In operation, the flexible strip 78 bumps into the compartment 34 as the strip 78 vibrates, and thereby transfers the vibrations to the compartment 34. Alternatively, the flexible strip 78 may be in contact with the adjacent compartment 34 while at rest.

It should be noted that the taper apparatus 10 may employ only one of the first and second vibrator modules 66 described above, and that use of even one of the vibrator modules 66 would still decrease the incidence of false rejections by the in-tape robotic vision system or station. Also, the second vibrator module 66 may be positioned upstream of the camera 58 if a second robotic vision station is used in the taper apparatus 10, provided the second vibrator module 66 vibrates the tape prior to the second inspection in the event of a rejection by the first robotic vision station.

It should further be noted that the vibrator module may be used in a machine other than the illustrated taper machine.

Referring to FIGS. 7 and 8, an alternative embodiment of the present invention is illustrated. Some components are similar to the construction described above, and like components are given like reference numbers. A vibrator module 94 includes a motor 98, an output shaft 102, an eccentric weight 106 and a vibration transferring member 110. The motor 98 is mounted to the taper apparatus 10 or the guide member 26 on a resilient mounting structure 114 (e.g., springs, rubber, etc.). An adjustable damper 118 is used to vary the amount of vibration caused by operation of the motor. The vibration transferring member 110 is mounted to the motor 98 and is used to transfer the vibration to the carrier tape 18.

Although particular constructions of the present invention have been shown and described, other alternative constructions will be apparent to those skilled in the art and are within the intended scope of the present invention. For example, the vibrator module 66 may include vibration sources other than the illustrated motors 70, 98 and eccentric weights 74, 106, such as piezoelectric material operating under the influence of pulse current, a relay switch operating at a selected frequency, a voice coil operating at a selected frequency, or other suitable vibration sources. Thus, the present invention is to be limited only by the following claims.

The invention claimed is:

1. A method for inspecting parts in carrier tape having pockets, the method comprising:
   performing a first inspection of a first part in a first pocket of the carrier tape;
   vibrating the carrier tape if the first part is rejected in the first inspection step;
   repositioning the first part in the first pocket in response to the vibrating step;
   performing a second inspection of the first part after the vibrating step to determine whether the first part was falsely rejected in the first inspection step; and
   inspecting a second part in a second pocket of the carrier tape;
   wherein the first pocket includes a relatively flat bottom, and wherein the repositioning step includes moving the first part from a non-parallel orientation with respect to the relatively flat bottom of the pocket to a generally parallel orientation with respect to the relatively flat bottom.

2. The method of claim 1, further comprising:
positioning the first part in the first pocket;
moving the first pocket carrying the first part into an inspection station; and
performing the first inspection step while the first pocket is in the inspection station.

3. The method of claim 2, wherein the vibrating, repositioning, and second inspection steps are also performed in the inspection station.

4. The method of claim 1, wherein the vibrating step includes energizing a vibration module to generate vibrations, and transferring vibrations from the vibration module to the carrier tape.

5. The method of claim 4, wherein the vibration module includes an electric motor having a rotatable output shaft and an eccentric weight on the output shaft, and wherein the energizing step includes providing power to the motor and rotating the output shaft and eccentric weight.

6. The method of claim 4, wherein transferring vibrations includes supporting the vibration module with a flexible member, positioning a portion of the flexible member proximate the carrier tape, vibrating the flexible member in response to the vibrations generated by the vibration module, and intermittently contacting the carrier tape with the flexible member in response to vibration of the flexible member.

7. The method of claim 1, wherein the first pocket includes a relatively flat bottom and generally upright sidewalls, and wherein the repositioning step includes moving the first part from an orientation in which the first part is tilted with respect to the relatively flat bottom and is at least partially supported by at least one of the sidewalls to an orientation in which the first part is supported only by the relatively flat bottom.

8. A method for inspecting parts in carrier tape having pockets, the method comprising:
performing a first inspection of a first part in a first pocket of the carrier tape;
vibrating the carrier tape if the first part is rejected in the first inspection step;
repositioning the first part in the first pocket in response to the vibrating step;
performing a second inspection of the first part after the vibrating step to determine whether the first part was falsely rejected in the first inspection step; and
inspecting a second part in a second pocket of the carrier tape;
wherein the first pocket includes a relatively flat bottom and generally upright sidewalls, and wherein the repositioning step includes moving the first part from an orientation in which the first part is supported by the relatively flat bottom and touches at least one of the sidewalls to an orientation in which the first part is supported by the relatively flat bottom and touches none of the sidewalls.

9. A method for inspecting parts in carrier tape having pockets, the method comprising:
performing a first inspection of a first part in a first pocket of the carrier tape;
vibrating the carrier tape;
moving the first part in the first pocket in response to the vibrating step;
performing a second inspection of the first part after the vibrating step; and
inspecting a second part in a second pocket of the carrier tape; wherein the vibrating step includes energizing a vibration module to generate vibrations, and transferring vibrations from the vibration module to the carrier tape; wherein transferring vibrations includes supporting the vibration module with a flexible member, positioning a portion of the flexible member proximate the carrier tape, vibrating the flexible member in response to the vibrations generated by the vibration module, and intermittently contacting the carrier tape with the flexible member in response to vibration of the flexible member.

10. The method of claim 9, further comprising:
positioning the first part in the first pocket before performing a first inspection;
moving the first pocket carrying the first part into an inspection station; and
performing the first inspection step while the first pocket is in the inspection station.

11. The method of claim 10, wherein the vibrating, moving, and second inspection steps are also performed in the inspection station.

12. A method for inspecting parts in carrier tape having pockets, the method comprising:
positioning a part in a pocket of the carrier tape;
performing a first vibration of the carrier tape after positioning the part in the pocket of the carrier tape;
inspecting the part in the pocket of the carrier tape after the first vibration;
performing a second vibration of the carrier tape after inspecting the part in the pocket of the carrier tape; and
reinspecting the part in the pocket after performing the second vibration;
wherein inspecting the part includes inspecting the part in an inspection station, and wherein the second vibration step is also performed in the inspection station; and
wherein inspecting and reinspecting are both performed with a single means for inspecting and the second vibration step is performed with a means for vibrating, and wherein the means for inspecting and the means for vibrating are positioned such that inspecting, second vibrating, and reinspecting are all performed in the inspection station and the carrier tape does not advance between the inspecting, second vibrating, and reinspecting steps.

13. The method of claim 12, wherein positioning a part includes positioning a part in a pocket of the carrier tape in a positioning station, and wherein the first vibration step is also performed in the positioning station.

* * * * *